United States Patent
Ishii et al.

(10) Patent No.: US 10,638,049 B2
(45) Date of Patent: Apr. 28, 2020

(54) DISPLAY CONTROL APPARATUS AND IMAGING APPARATUS

(71) Applicant: CANON KABUSHIKI KAISHA, Tokyo (JP)

(72) Inventors: Kazunori Ishii, Yokohama (JP); Makoto Yokozeki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/984,514

(22) Filed: May 21, 2018

(65) Prior Publication Data

US 2018/0343395 A1 Nov. 29, 2018

(30) Foreign Application Priority Data

May 24, 2017 (JP) ................................ 2017-102497

(51) Int. Cl.
*H04N 5/232* (2006.01)

(52) U.S. Cl.
CPC ... *H04N 5/232939* (2018.08); *H04N 5/23219* (2013.01); *H04N 5/23222* (2013.01); *H04N 5/232122* (2018.08); *H04N 5/232941* (2018.08); *H04N 5/232945* (2018.08)

(58) Field of Classification Search
CPC ........ H04N 5/23212–232127; H04N 5/23218; H04N 5/23219; H04N 5/23222; H04N 5/23293; H04N 5/232939; H04N 5/232941; G03B 3/10; G03B 13/32–35; G03B 13/02–16; G02B 7/28–40
See application file for complete search history.

(56) References Cited

U.S. PATENT DOCUMENTS

| | | | |
|---|---|---|---|
| 2015/0103223 A1* | 4/2015 | Park | H04N 5/23212 348/333.12 |
| 2015/0281555 A1* | 10/2015 | Kishida | H04N 5/23212 348/346 |
| 2016/0295100 A1* | 10/2016 | Yokozeki | H04N 5/23212 |
| 2016/0295120 A1* | 10/2016 | Ota | H04N 5/23293 |
| 2016/0295122 A1* | 10/2016 | Ishii | H04N 5/23212 |

(Continued)

FOREIGN PATENT DOCUMENTS

| | | |
|---|---|---|
| JP | 2001-083407 A | 3/2001 |
| JP | 2005-140943 A | 6/2005 |

(Continued)

OTHER PUBLICATIONS

The above references were cited in a Apr. 23, 2019 Japanese Office Action, which is enclosed with an English Translation, that issued in Japanese Patent Application No. 2017-102497.

*Primary Examiner* — Paul M Berardesca

(74) *Attorney, Agent, or Firm* — Cowan, Liebowitz & Latman, P.C.

(57) ABSTRACT

A display control apparatus includes a focus detector configured to detect a focus state based on an image signal acquired from an imaging part, a main object detector configured to detect a main object among objects in an image based on the image signal output from the imaging part, and a display controller configured to display on a display unit an index representing the focus state detected by the focus detector on the main object detected by the main object detector in manual focusing. The display controller controls switching of the main object in the manual focusing.

11 Claims, 14 Drawing Sheets

(56) References Cited

U.S. PATENT DOCUMENTS

2017/0223275 A1* 8/2017 Yanagisawa ....... H04N 5/23212
2018/0106982 A1* 4/2018 Uemura ................ G03B 13/36

FOREIGN PATENT DOCUMENTS

| JP | 2007-248615 A | 9/2007 |
| JP | 2008/098954 A | 4/2008 |
| JP | 2010-187145 A | 8/2010 |
| JP | 2016-197177 A | 11/2016 |

* cited by examiner

BACK FOCUS        FRONT FOCUS

BACK FOCUS        FRONT FOCUS

DISPLAY CONTROL APPARATUS AND IMAGING APPARATUS

BACKGROUND OF THE INVENTION

Field of the Invention

The present invention relates to a display control apparatus and an imaging apparatus configured to detect a focus state and to control a display of the focus state.

Description of the Related Art

A focusing apparatus in a recent high-resolution video camera etc. compatible with the full high vision and 4K has a resolution higher than that of prior art, and it is not easy for a photographer to strictly focus on an object through manual focusing operation ("MF" operation). In particular, when the photographer performs focusing while confirming the object through a viewfinder, a display panel, etc., a defocus may occur which cannot be recognized by the viewfinder, the display panel, etc., and it is difficult to determine whether the intended focus state is obtained.

A focus assist method for assisting the MF operation has recently been proposed. Japanese Patent Laid-Open No. ("JP") 2007-248615 discloses a method for calculating an in-focus evaluation value in an MF operation and for displaying an in-focus degree through a bar. JP 2005-140943 discloses, as a focus assisting method for an imaging apparatus, a plurality of display methods that represent a change of a focus state as a focus lens moves. JP 2001-083407 discloses, as a focus state detecting method, an imaging apparatus that provides an imaging plane phase difference detection method based on a live-view mode used to capture an image while the image is displayed on a back motor, etc.

Another proposed camera serves to determine a target face (main face) based on a position and a size of the face automatically recognized with a face detection function where there are a plurality of human objects in capturing a person. This camera sets a focus detecting area for a main face and performs a focus detecting process.

A camera is disadvantageous that serves to automatically determine a main face among a plurality of faces with a face detecting function and provides a focus assisting function and a display control to the main face selected among the plurality of human objects.

A main human object to be captured by the photographer is often disposed at the center of an image. Since the main human object is likely closer to the camera than other objects, the main human object is likely largest among objects. When the camera determines as a main face a large object located at or near the center of the image in accordance with the photographer's intent, the photographer does not feel strange.

However, for example, in capturing a motion image in a crowded scene, another larger face may approach to the center position than the current main face in the current image of the camera. When the camera automatically switches the main face to the other face while the photographer provides the MF operation on the current main face through the focus assisting function, the target for the focus assisting display may become the other face. As a result, manual focusing targeted by the photographer on the object fails.

In addition, an imaging scene with many persons contains many faces in the image and causes the main face to be frequently switched. Moreover, as another face crosses in front of the main face, the main face may be switched. When the main face is switched while the focus assisting display and the MF operation on the main face are used, the photographer may feel strange or unpleasant.

SUMMARY OF THE INVENTION

The present invention provides a display control apparatus and an imaging apparatus for a stable focus assisting function in manual focusing which can relieve a photographer from feeling strange or unpleasant.

A display control apparatus according to the present invention includes a focus detector configured to detect a focus state based on an image signal acquired from an imaging part, a main object detector configured to detect a main object among objects in an image based on the image signal output from the imaging part, and a display controller configured to display on a display unit an index representing the focus state detected by the focus detector on the main object detected by the main object detector in manual focusing. The display controller controls switching of the main object in the manual focusing.

Further features of the present invention will become apparent from the following description of exemplary embodiments with reference to the attached drawings.

DESCRIPTION OF THE EMBODIMENTS (Structure of Imaging System)

Figure 1:
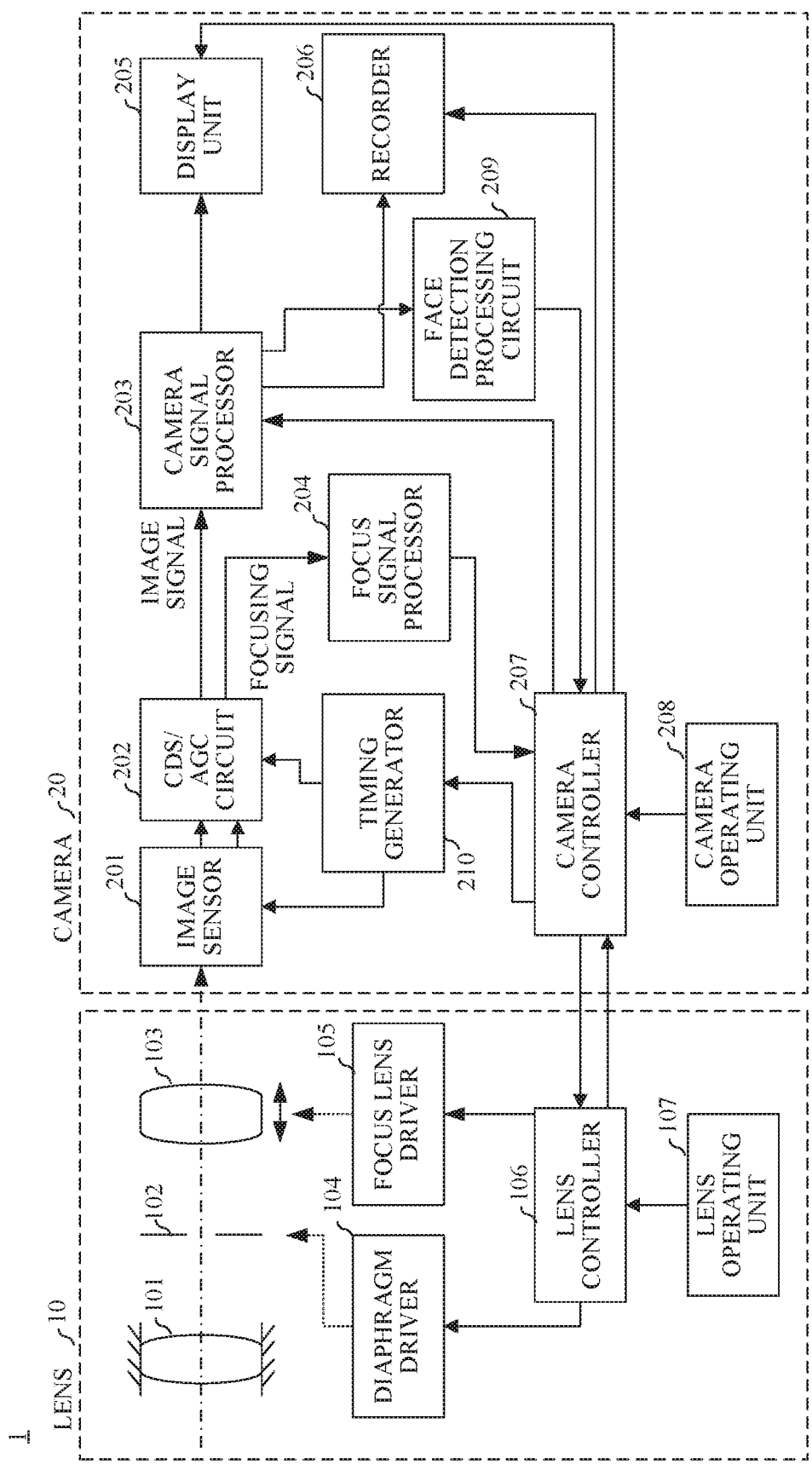
FIG. 1 is a block diagram of a schematic structure in an imaging system according to embodiments of the present invention.

FIG. 1 is a block diagram of a schematic structure in an imaging system 1 having a focus assisting function according to embodiments of the present invention. The imaging system 1 includes a lens unit 10 and a camera body 20.

While this embodiment detachably attaches the lens unit 10 to the camera body, but the lens unit 10 may be integrated with the camera body 20.

A description will now be given of the structure of the lens unit 10. The lens unit 10 includes a fixed lens 101, a diaphragm (aperture stop) 102, a focus (or focusing) lens 103, an unillustrated zoom (or zooming) lens, etc. The diaphragm 102 is driven by a diaphragm controller 104, and controls an incident light quantity on an image sensor 201, which will be described later. The focus lens 103 is driven by a focus lens driver 105 for focusing. The zoom lens is driven by an unillustrated zoom lens driver for zooming. While this embodiment 10 includes the zoom lens and the zoom lens driver, these components are not indispensable to the present invention and may be omitted.

A lens controller 106 integrally controls operations of the entire lens unit 10, and communicates data with a camera controller 207 that integrally controls entire operations of the entire imaging system 1. The lens controller 106 controls the diaphragm driver 104, the focus lens driver 105, and the zoom lens driver in accordance with control commands and control information received form the camera controller 207, and sends lens information to the camera controller 207. The lens controller 106 controls the diaphragm driver 104, the focus lens driver 105, and the zoom lens driver, and thereby an aperture diameter in the diaphragm 102, the positions of the focus lens 103 and the zoom lens. In addition, the lens controller 106 provides a control in accordance with a user operation for focusing, zooming etc., when the user manipulates a focus ring, a zoom ring etc. in a lens operating unit 107.

A description will now be given of the structure in the camera body 20 having the focus assisting function. The image sensor 201 includes a CCD or CMOS sensor, and the light flux from the imaging optical system in the lens unit 10 forms an image on a light receiving plane on the image sensor 201. The formed object image is photoelectrically converted into electric charges in accordance with the incident light amount and stored by photodiodes (photoelectric converters) in the image sensor 201. The electric charges stored by each photodiode is sequentially read as a voltage signal corresponding to the electric charges out of the image sensor 201 based on a driving pulse given by a timing generator 210 in accordance with a command from the camera controller 207. The detailed structure of the image sensor 201 will be described later, but the image sensor 201 according to this embodiment can output a pair of focusing signals usable for a phase difference type focus detection as well as a usual capture signal.

The capture signal and focusing signal read out of the image sensor 201 are input into a CDS/AGC circuit 202. The CDS/AGC circuit 202 performs correlated double sampling for removing reset noises, a gain control, and a signal digitalization. The CDS/AGC circuit 202 outputs a processed capture signal to a camera signal processor 203, and the processed focusing signal to a focus signal processor 204.

The camera signal processor 203 performs various image processing for the capture signal output from the CDS/AGC circuit 202, and generates an image signal. The display unit 205 is a display device, such as an LCD and an organic EL, and displays an image based on the image signal output from the camera signal processor 203. When the camera body 20 is set to a recording mode for recording the capture signal, the capture signal is sent from the camera signal processor 203 to a recorder 206 and recorded in a recording medium, such as an optical disc, a semiconductor memory, a magnetic tape.

The focus signal processor 204 detects a focus state through a correlation calculation based on a pair of focusing signals output from the CDS/AGC circuit 202. In this embodiment, the focus signal processor 204 calculates the focus state, such as a correlation amount, a defocus amount, and reliability information (coincidence between two images ("two-image coincidence"), steepness of two images ("two-image steepness"), contrast information, saturation information, and scratch information). The focus signal processor 204 outputs the calculated defocus amount and reliability information to the camera controller 207. The camera controller 207 notifies the focus signal processor 204 of a setting change for calculating the defocus amount and reliability based on the acquired defocus amount the reliability information.

The camera controller 207 communicates information with and provides controls over each component in the camera body 20. In addition, the camera controller 207 controls the power on/off, the setting change, and recording in accordance with the input from the camera operating unit 208 operated by the user as well as controlling processes in the camera body 20. Moreover, the camera controller 207 performs a variety of functions in accordance with the user operation, such as switching between autofocus (AF) control and manual focus (MF) control and a confirmation of a recorded image. In addition, the camera controller 207 communicates information with the lens controller 106 so as to send information of a control command and control information for the imaging optical system, and to acquire information in the lens unit 10.

A face detection processing circuit or processor (main object detector) 209 performs a face recognition process for an image signal output from the camera signal processor 203 and detects, as an object area, a face area of a main object in a captured image (or performs a face detecting process). One conventional face recognition process is, for example, a method for detecting a skin color area from a gradation color in each pixel expressed by image data corresponding to an image signal, and for detecting a face area based on a matching degree with a contour plate of a previously prepared face. In addition, one conventional pattern recognition technology is a method for detecting a face area by extracting feature points in a face, such as an eye, a nose, and a mouth. The face recognition process may be executed by another method that is different from the above method.

The face detection processing circuit 209 sends a detection result (face information) that contains object position information to the camera controller 207. The object position information is defined as information on the position of the object area in the captured image. The camera controller 207 sends information to the focus signal processor 204 based on the received detection result so as to add the area used for the focus detection to the position that contains the face area in the captured image.

The camera controller 207 sends information, such as the face area position and size, to the camera signal processor 203 so as to inform the photographer of the face area recognized by the face detection processing circuit 209, and displays a face frame corresponding to this information on the display unit 205 while the face frame is superimposed on the image signal.

The camera operating unit 208 serves to switch the control (face detection control) by the face detection process between the valid state and the invalid state. When the face detection control is valid, the camera controller 207 performs the control in accordance with the face detection process result about the focus assisting control etc. In addition, the camera operating unit 208 serves to select and specify the object in accordance with the operating input of the photographer who wishes to fix an object to a specific object. When the photographer selects and specifies a specific face using an operating member, such as a cross key and a touch panel, the camera controller 207 performs a focus assisting control etc. for the selected and specified face (referred to as a "main face selection" hereinafter).

(Structure of Image Sensor)

Figure 2:
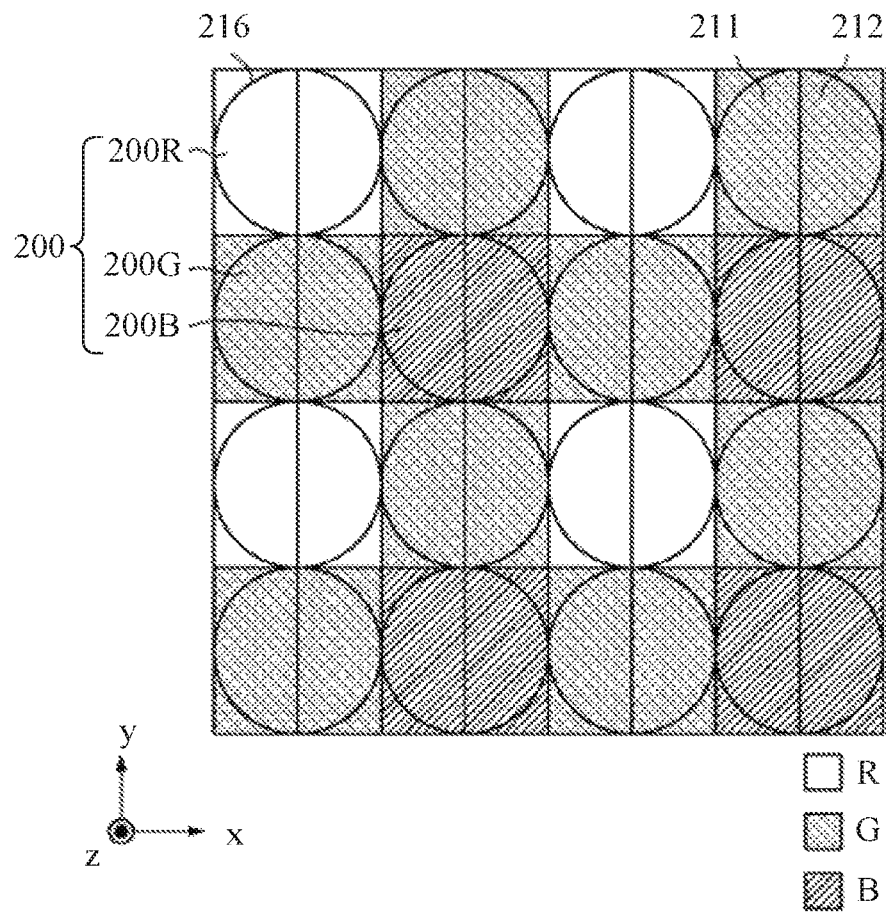
FIG. 2 is a schematic diagram of a pixel array in an image sensor.

FIG. 2 illustrates a 4 column×4 row range of a pixel array in a two-dimensional CMOS sensor used for the image sensor 201 (where the focus detecting pixel array has an 8 column×4 row range).

In this embodiment, the pixel unit 200 includes a 2 column×2 row pixel array covered by Bayer-arrayed color filters. In the pixel group 200, a pixel 200R having a R (red) spectral sensitivity is disposed at an upper left position. A pixel 200G having a G (green) spectral sensitivity is disposed at upper right and lower left positions. A pixel 200B having a B (blue) spectral sensitivity is disposed at a lower right position. The image sensor 201 provides an imaging plane phase difference type of focus detection, and each pixel includes a plurality of photodiodes (photoelectric converters) for one micro lens 215. In this embodiment, each pixel has two photodiodes 211 and 212 arranged in a 2 row×1 column matrix.

The image sensor 201 can acquire the capture signal and the focusing signal by arranging many pixel groups 200 each of which includes a 2 column×2 row pixel array (or a 4 column×2 row photodiode array).

Each pixel in this embodiment separates a light flux through the micro lens 215 and receives through the photodiodes 211 and 212. A signal made by adding signals from the photodiodes 211 and 212 to each other (A+B image signal) is used for the capture signal, and the two signals (A and B image signals) read out of the photodiodes 211 and 212 are used for the focusing signals. The capture signal and the focusing signal may be separately read out, but the image signal (A+B image signal) and the one of the signals (such as the A image signal) in the focusing signals from among the photodiodes 211 and 212 so as to lessen the processing load. The other signal (such as the B image signal) can be acquired by calculating a difference between these signals.

Each pixel in this embodiment has the two photodiodes 211 and 212 for one micro lens 215, but the number of photodiodes is not limited to two and may be more than two. A plurality of pixels in which light receivers have different opening positions may be used for the micro lens 215. In other words, another structure may be employed as long as it provides two signals, such as the A image signal and the B image signal, for the phase difference detection. In addition, every pixel in this embodiment has a plurality of photodiodes as illustrated in FIG. 2, but the focus detecting pixels may be discretely provided among normal pixels in the image sensor 201.

First Embodiment (Focus Assisting Display Modes)

Referring to FIGS. 3A to 3D, a focus assisting display mode according to this embodiment will be described. In this embodiment, there are four focus assisting display types or the first to fourth display modes, and display parts 301 to 317 express the detected focus state.

Figure 3A:
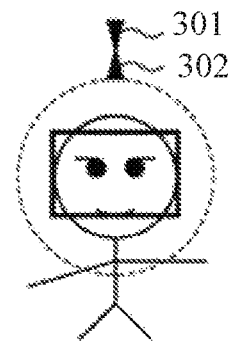
FIGS. 3A-3D illustrate examples of a focus assisting display according to a first embodiment.

FIG. 3A illustrates one example of the first display mode in which it is determined that the object is focused, and the position of the inward display part 301 and the position of the outward display part 302 are aligned with each other at the top. In addition, for example, the display part 301 and the display part 302 may be expressed in different colors, such as white and green.

Figure 3B:
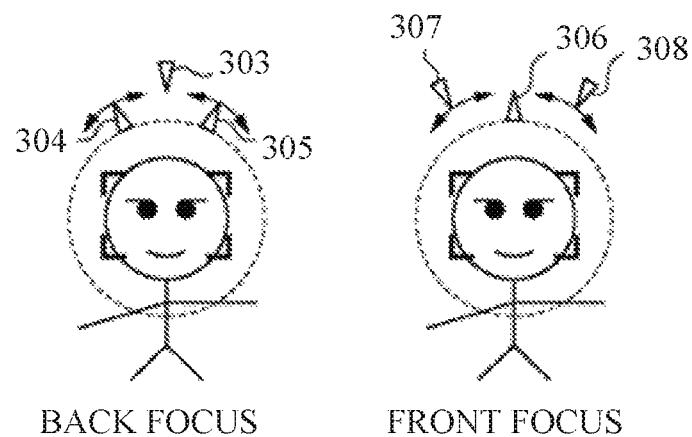

FIG. 3B illustrates one example of the second display mode in which the focus detecting result has high reliability although the object is not focused, and FIG. 3B shows a direction to an in-focus position and a defocus amount. For example, when the infinity side of the object is focused (back focus), the inward display part 303 stops at the top and the outward display parts 304 and 305 move laterally symmetrically along the circumference. The positions of the display parts 304 and 305 indicate the defocus amount, and as both are more distant from the position of the display part 303 (reference position), the defocus amount is larger. The display part 303 corresponds to the display part 301, and the display parts 304 and 305 which are superimposed on each other correspond to the display part 302.

On the other hand, when the near side of the object is focused (front focus), the outward display part 306 stops at the top, and the inward display parts 307 and 308 laterally symmetrically move along the circumference. The positions of the display parts 307 and 308 indicate the defocus amount, and as both are more distant from the position of the display part 306 (reference position), the defocus amount is larger. The display part 306 corresponds to the display part 302, and the display parts 307 and 308 which are superimposed on each other correspond to the display part 301.

As described above, the defocus amount can be expressed by the position of the moving display part in the second display mode. In addition, the direction towards the in-focus position (defocus direction) can be expressed by the orientation of the display part that stops at the top.

Figure 3C:
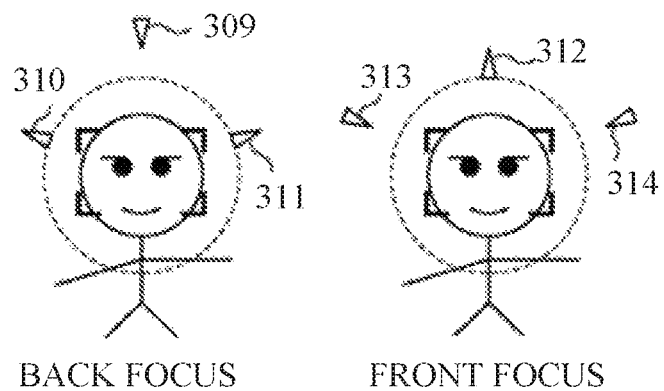

FIG. 3C illustrates one example of the third display mode in which the focus detecting result has intermediate reliability, and FIG. 3C shows the direction to the in-focus position. In this state, irrespective of the defocus amount, the display parts 309 to 314 are fixed at predetermined positions. In the back focus, the inward display part 309 stops at the top, whereas in the front focus, the outward display part 312 is fixed at the top. In other words, the third display mode does not indicate the magnitude of the defocus amount and illustrates the direction to the in-focus position through the orientation of the display part fixed at the top.

Figure 3D:
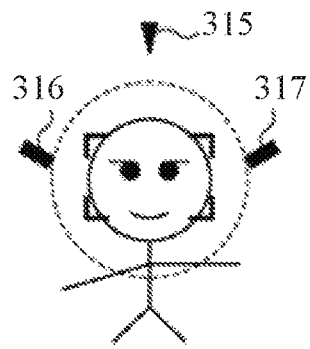

FIG. 3D illustrates one example of the fourth display mode in which the focus detecting result has low reliability. FIG. 3D does not show the defocus amount or defocus direction and makes the user visually recognize that the focus detection fails. In this state, the display parts 315 to 317 are expressed by different colors from those of the other examples, such as gray, and the fixed at the predetermined positions. In addition, the display parts 316 and 317 have shapes different from those of the other display modes.

FIGS. 3A to 3D merely illustrate examples of the focus assisting displays, and the present invention is not limited to these examples.

(Focus Assisting Display Control)

Figure 4:
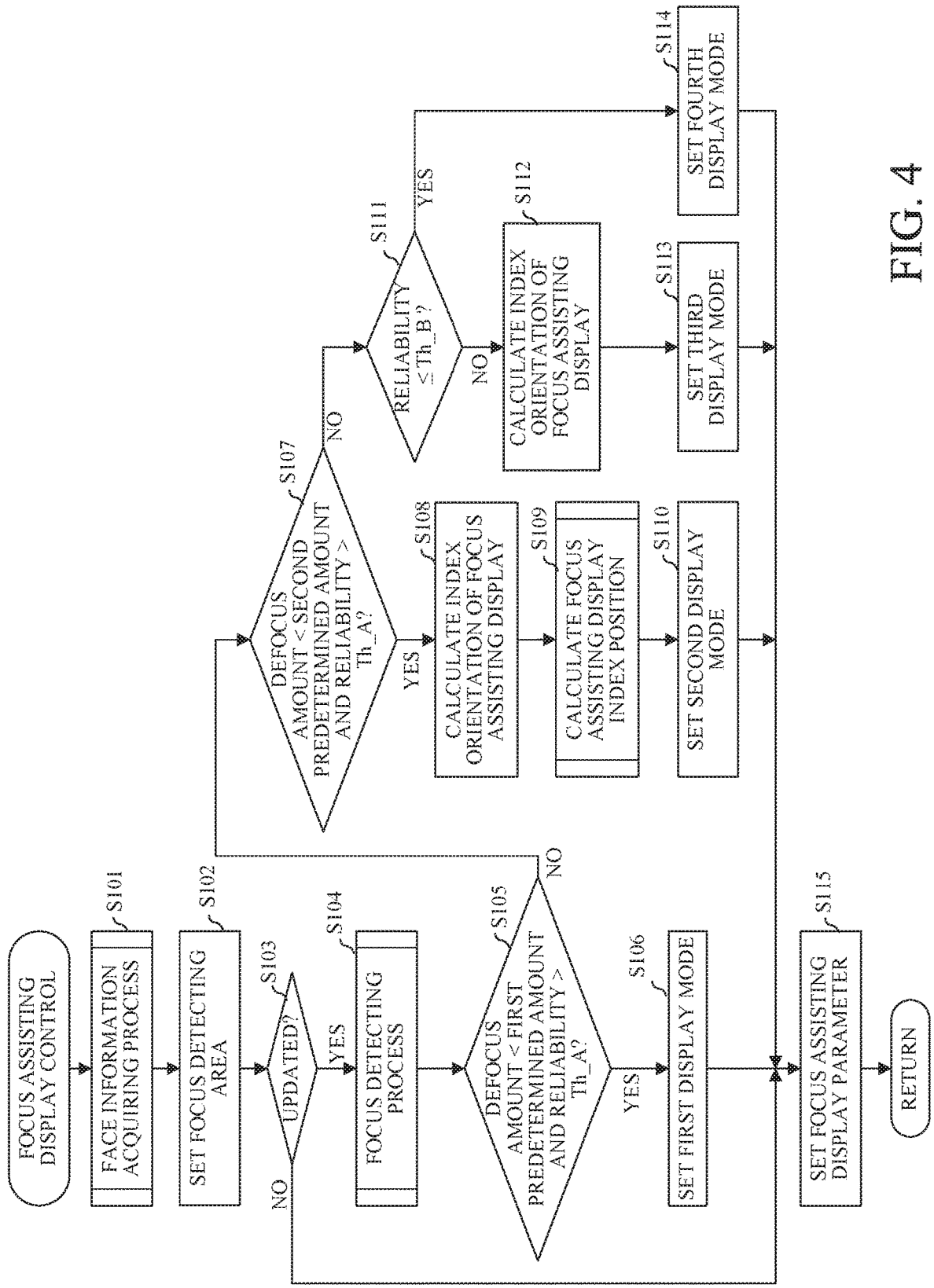
FIG. 4 is a flowchart of a focus assisting display control method according to the first embodiment.

Referring now to FIG. 4, a description will be given of a focus assisting display control method executed by the camera controller 207. FIG. 4 is a flowchart of the focus assisting display control method. The focus assisting display control method according to this embodiment is executed every predetermined period in accordance with a computer program that runs on software and hardware. For example, it is executed every readout period (every vertical synchronizing period) of the capture signal from the image sensor 201 for generating the image for one frame (or one field). It may be repeated a plurality of times in the vertical synchronizing period. The computer program may be stored, for example, in the camera controller 207 or a computer-readable storage medium. While the camera controller 207 according to this embodiment executes the focus assisting display control method but a personal computer (PC) or a dedicated machine may execute, as the display control apparatus, the focus assisting display control method according to this embodiment. In addition, a circuit corresponding to the computer program according to this embodiment may be provided, and the focus assisting display control method according to this embodiment may be executed by operating the circuit.

In the step S101, the camera controller 207 acquires face information from the face detection processing circuit 209.

In the step S102, the camera controller 207 sets a focus detecting area based on the face information acquired in the step S101.

In the step S103, the camera controller 207 determines whether the focus signal has been updated in the focus signal processor 204. When it has been updated, the flow moves to the step S104, and when it is not updated, the flow moves to the step S115.

In the step S104, the camera controller 207 instructs the focus signal processor 204 to execute the focus detecting process and acquires the defocus amount and the reliability as a result of the focus detecting process result.

Figure 5:
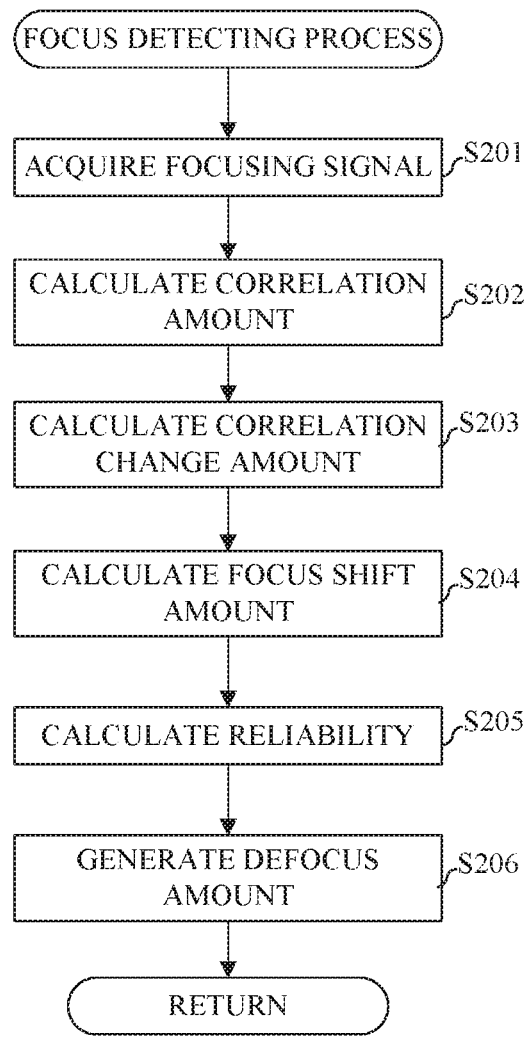
FIG. 5 is a flowchart of a focus detecting process according to the first embodiment.

A description will now be given of the focus detecting process executed by the focus signal processor 204. FIG. 5 illustrates a flowchart of the focus detecting process according to this embodiment.

In the step S201, the focus signal processor 204 acquires a pair of focusing signals from the focus detecting area set in the step S102.

In the step S202, the focus signal processor 204 calculates a correlation amount based on a pair of focusing signals acquired in the step S201.

In the step S203, the focus signal processor 204 calculates a focus change amount based on the correlation amount calculated in the step S202.

In the step S204, the focus signal processor 204 calculates a focus shift amount based on the correlation change amount calculated in the step S203.

In the step S205, the focus signal processor 204 calculates the reliability of the focusing signal acquired in the step S201. The liability represents how reliable the focus shift amount calculated in the step S204 is.

In the step S206, the focus signal processor 204 converts the focus shift amount into a defocus amount.

The defocus amount may be expressed by an absolute distance from the in-focus position, or the number of necessary pulses for moving the focus lens 103 to the in-focus position, or an index having a different dimension and unit, or a relative index. In other words, the defocus amount may represent a determination criterion of the separation degree from the in-focus state or a focus control amount necessary for the in-focus state.

Figure 6A:
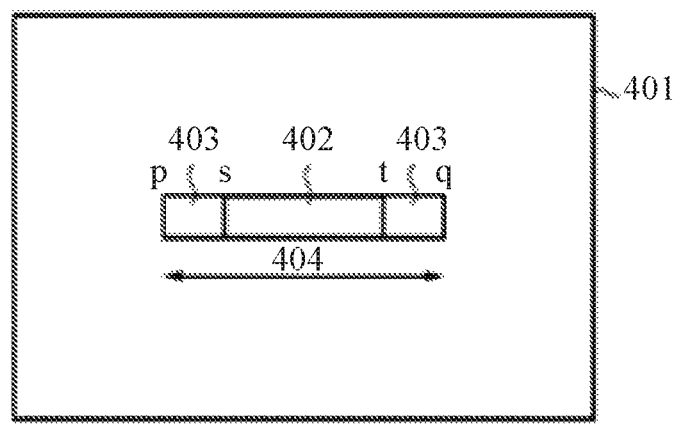
FIGS. 6A-6D illustrate examples of a focus detecting area and an image signal obtained from the focus detecting area.

Referring now to FIGS. 6A to 8, a detailed description will be given of the focus detecting process. FIG. 6A illustrates one example of the focus detecting area 402 set on a pixel array 401 in the image sensor 201. A calculation area 404 used to read the focusing signal necessary for the following correlation calculation includes a combination of a focus detecting area 402 and shift areas 403 necessary for the correlation calculation. In FIG. 6A, each of p, q, r, and t represents a coordinate in the x-axis direction, and the calculation area 404 ranges from p to q, and the focus detecting area 402 ranges from s to t.

Figure 6B:
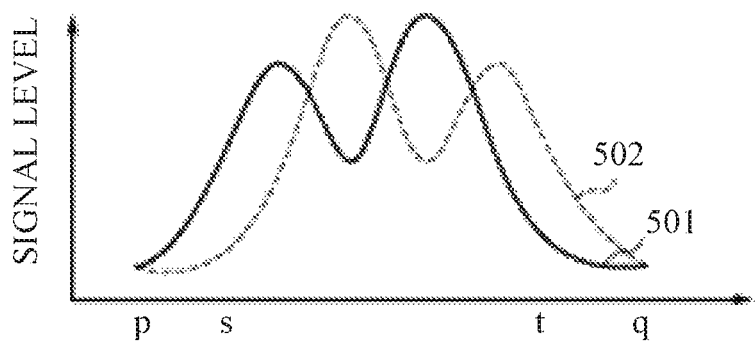
Figure 6C:
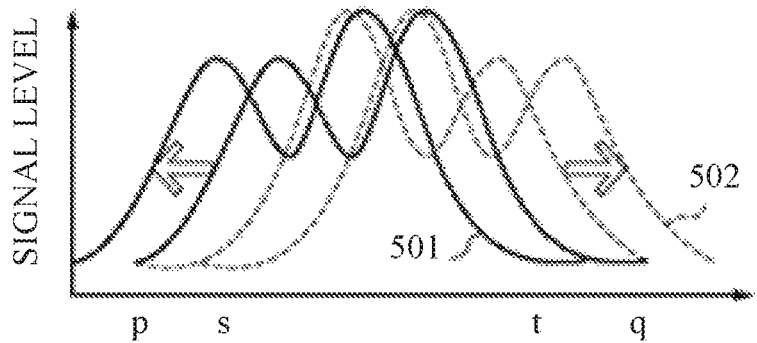
Figure 6D:
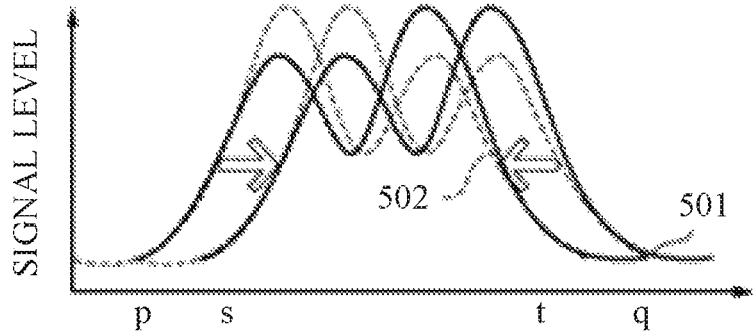

FIGS. 6B to 6D illustrate one example of the focusing signal acquired from the calculation area 404 in FIG. 6A. In each figure, a range from s to t corresponds to the focus detecting area 402, and a range from p to q corresponds to the calculation area 404 based on the shift amount. A solid line 501 represents the A image signal, and a broken line 502 represents the B image signal.

FIG. 6B illustrates waveforms of the A image signal 501 and the B image signal 502 before they are shifted. FIG. 6C illustrates the waveforms of the A image signal 501 and the B image signal 502 shifted in the positive direction from those illustrated in FIG. 6B. FIG. 6D illustrates the waveforms of the A image signal 501 and the B image signal 502 shifted in the negative direction from those illustrated in FIG. 6B. In calculating the correlation amount, each of the A image signal 501 and the B image signal 502 is shifted one bit at a time in the arrow direction.

Next follows a description of a correlation amount COR calculating method in the step S202 in FIG. 5. The focus signal processor 204 shifts the A image signal 501 and the B image signal 502 one bit at a time, and calculates an absolute value of a sum of a difference between the A image signal 501 and the B image signal 502 in the set focus detecting area 402 in each shift state. Herein, a minimum shift number is p-s, and a maximum shift amount is q-t. Where "i" is a shift amount, "x" is a starting coordinate of the focus detecting area, and "y" is an ending coordinate of the focus detecting area, the correlation amount COR is calculated as follows:

$$COR[i]=\Sigma_{k=x}^{y}|A[k+i]-B[k-i]|\{(p-s)<i<(q-t)\} \quad (1)$$

Figure 7A:
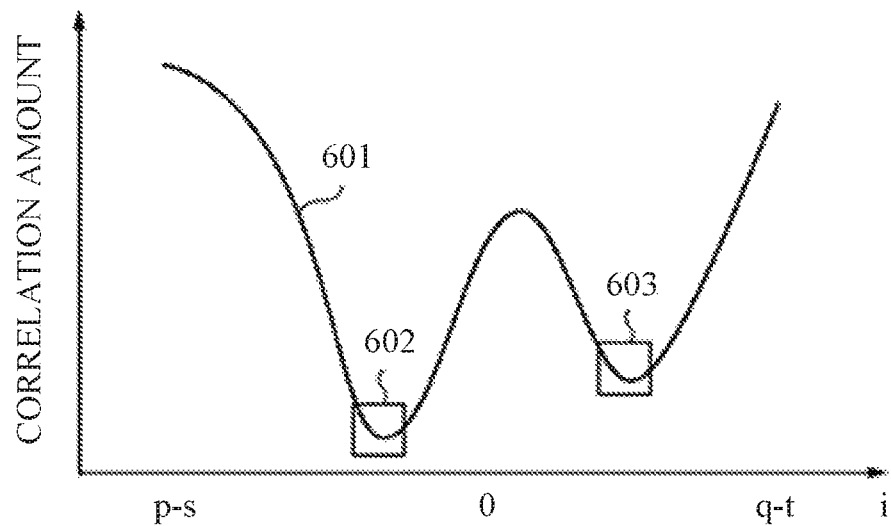
FIGS. 7A and 7B explain a correlation calculating method according to the first embodiment.

FIG. 7A illustrates one example of a change of the correlation amount, where the abscissa axis in the graph represents the shift amount and the ordinate axis represents the correlation amount. In a correlation amount waveform 601, reference numerals 602 and 603 denote segments around peak values. As the correlation amount is smaller, the coincidence degree between the A image signal 501 and the B image signal 502 becomes higher.

Next follows a description of a correlation change amount ΔCOR calculating method in the step S203 in FIG. 5. The focus signal processor 204 calculates the correlation change amount based on the correlation amount difference of one shift skip and on the correlation amount waveform 601 in FIG. 7A. In this case, the minimum shift number is p-s in FIGS. 7A and 7B, and the maximum shift number is q-t in FIGS. 7A and 7B. Where "i" represents the shift amount, the correlation change amount ΔCOR is calculated as follows:

$$\Delta COR[i]=\Delta COR[i-1]-\Delta COR[i+1](p-s+1)<i<(q-t-1) \quad (2)$$

Figure 7B:
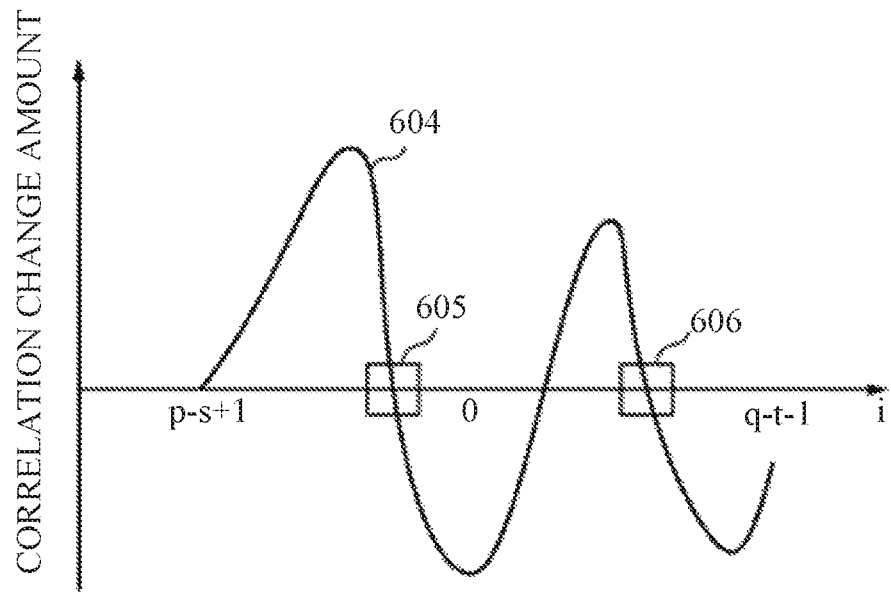

FIG. 7B illustrates one example of the correlation change amount ΔCOR, where the abscissa axis in the graph represents the shift amount and the ordinate axis represents the correlation amount. In a correlation amount waveform 604, reference numerals 605 and 606 denote segments containing inflection points of the correlation change amount from plus to minus. In the segments 605 and 606, the state in which the correlation change amount is zero is referred to as a zero cross. In this state, the coincidence degree between the A image signal 501 and the B image signal 502 is highest and the focus shift amount is calculated based on the shift amount.

Figure 8A:
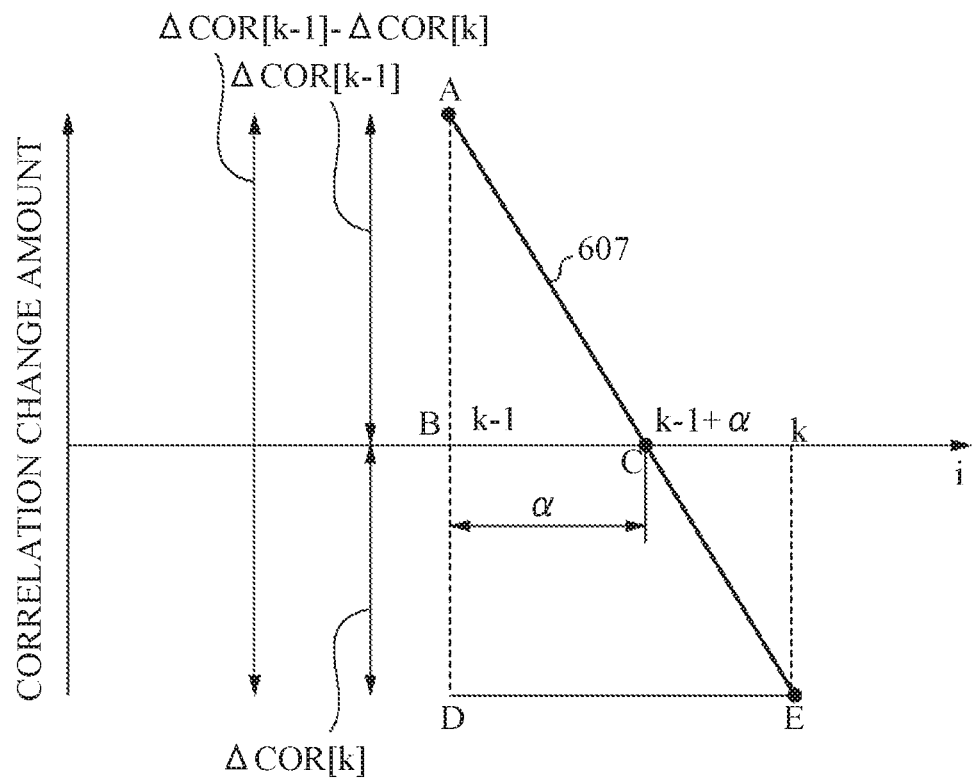
FIGS. 8A and 8B explain a correlation calculating method according to the first embodiment.

FIG. 8A is an enlarged view of the segment 605 in FIG. 7B, and reference numeral 607 denotes part of the correlation change amount waveform 604. Referring now to FIG. 8A, a description will be given of a focus shift amount PRD calculating method in the step S204.

The focus shift amount PRD includes an integer part β and a decimal part α. The decimal part α is calculated as follows based on a similarity relationship between a triangle ABC and a triangle ADE in FIG. 8A.

$$AB:AD = BC:DE \quad (3)$$
$$\Delta COR[k-1]:\Delta COR[k-1] - \Delta COR[k] = \alpha:k - (k-1)$$
$$\alpha = \frac{\Delta COR[k-1]}{\Delta COR[k-1] - \Delta COR[k]}$$

The integer part β is calculated as follows based on FIG. 8A.

$$\beta = k-1 \quad (4)$$

The focus shift amount PRD is calculated based on the decimal part α and the integer part β calculated in this way.

When there are a plurality of zero-crossing points as illustrated in FIG. 7B, a first zero cross is defined as a part having large steepness maxder of a correlation amount change at the zero cross (referred to as "steepness" hereinafter). The steepness is an index representing the easiness of specifying the in-focus position, and a larger value means that the in-focus position is more likely to be specified. The steepness is calculated as follows:

$$\text{maxder} = |\Delta COR[k-1]| + |\Delta COR[k]| \quad (5)$$

As described above, when there are a plurality of zero crosses, the first zero cross is determined based on the steepness at the zero cross.

Next follows a description of a reliability calculating method of the focusing signal in the step S205 in FIG. 5. The reliability corresponds to the reliability of the defocus amount. The following calculation method is one example, and the reliability may be calculated by another method. The reliability can be defined as the above steepness and a coincidence degree fnc[v] between the A image signal and the B image signal (referred to as a "two-image coincidence degree" hereinafter). The two-image coincidence degree is an index representing the accuracy of the focus shift amount, and a smaller value means a higher accuracy.

Figure 8B:
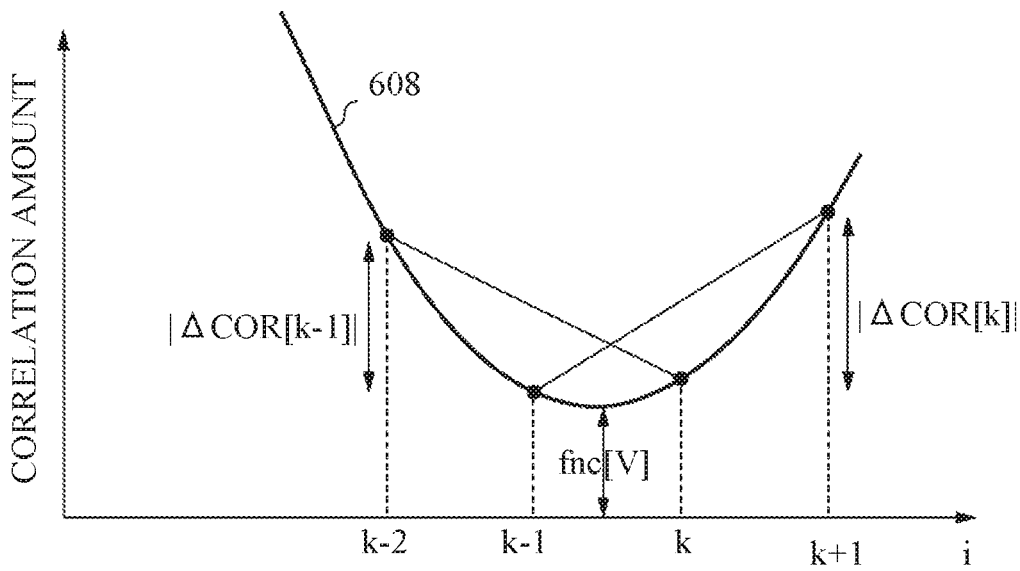

FIG. 8B is an enlarged view of the part 602 in FIG. 7A, and the reference numeral 608 denotes part of the correlation amount waveform 601. The two-image coincidence degree is calculated as follows:

(i) Where $\Delta COR[k-1] \times 2 \le \text{maxder}, fnc[v] = COR[k-1] + \Delta COR[k-1]/4$ (ii) Where $\Delta COR[k-1] \times 2 > \text{maxder}, fnc[v] = COR[k] - \Delta COR[k]/4 \quad (6)$ In the step S104, when the focus detecting process ends, the flow moves to the step S105. In the step S105, the camera controller 207 determines whether the defocus amount is smaller than a first predetermined amount and the reliability is higher than a first threshold Th_A. When the defocus amount is smaller than the first predetermined amount and the reliability is higher than the first threshold Th_A, the flow moves to the step S106 and when the defocus amount is larger than the first predetermined amount or the reliability is lower than the first threshold Th_A, the flow moves to the step S107.

The first predetermined value is used to determine whether the position of the focus lens 103 is within an in-focus range for the object. In an example, this embodiment sets the first predetermined value based on the depth of focus. In addition, the first threshold Th_A is set to a level such that the accuracy of the calculated defocus amount is reliable. When the reliability is higher than the first threshold Th_A, for example, the A image signal and the B image signal have high contrasts and similar shapes (or the two-image coincidence degree is high) or the main object image is focused.

In the step S106, the camera controller 207 sets the focus assisting display to the first display mode in FIG. 3A.

In the step S107, the camera controller 207 determines whether the defocus amount is smaller than a second predetermined amount smaller than the first predetermined amount and the reliability is higher than the first threshold Th_A. When the defocus amount is smaller than the second predetermined amount and the reliability is higher than the first threshold Th_A, the flow moves to the step S108 and when the defocus amount is larger than the second predetermined amount or the reliability is lower than the first threshold Th_A, the flow moves to the step S111.

In the step S108, the camera controller 207 calculates the index orientation based on the defocus direction so as to set the index representing the direction and amount to the in-focus through the focus assisting display.

In the step S109, the camera controller 207 calculates the position for displaying the display part that moves in the second display mode in FIG. 3B based on the defocus amount.

In the step S110, the camera controller 207 sets the focus assisting display to the second display mode in FIG. 3B.

In the step S107, the second predetermined value is a defocus value detected irrespective of the object. For example, a detectable defocus amount is different between a high-contrast object and a low-contrast object. In this case, the displayable state is different in the second display mode depending on the object, and the user may feel strange. Hence, the second predetermined amount is an amount that provides the defocus amount to some extent irrespective of the object. This embodiment sets the defocus amount to 2 mm in an example. However, the setting method is not limited and is different according to the shift amount in calculating the focus shift amount. Where the defocus amount in which the shift amount exceeds 2 mm cannot be detected, the setting is unnecessary and the second predetermined amount may be extremely large.

When the defocus amount may be determined based on the operability of the focus assisting display. In the second display mode, the moving display part represents a shift from the in-focus state. Hence, when the large shift from the display part fixed at the top is displayed, the user is unlikely to recognize the distance to the in-focus position. In addition, when the focus assisting display size is larger due to the display method, it becomes difficult to recognize the image and thus the defocus amount may be determined based on these factors.

In the step S111, the camera controller 207 determines whether the reliability is equal to or lower than a second threshold Th_B. When the reliability is equal to or lower than the second threshold Th_B, the flow moves to the step S114, and when the reliability is higher than the second threshold Th_B, the flow moves to the step S112.

In the step S112, the camera controller 207 calculates the orientation of the index of the focus assisting display based on the defocus direction.

In the step S113, the camera controller 207 sets the focus assisting display to the third display mode in FIG. 3C.

Thus, when the reliability is lower than the first threshold Th_A and higher than the second threshold Th_B or when the reliability is intermediate, it is determined that the defocus direction representing the direction in which the in-focus position is likely to exist is accurate. With the intermediate reliability, the two-image coincidence degree calculated by the focus signal processor 204 is lower than the predetermined value but the correlation amount obtained by shifting the A image signal and the B image signal to each other has a certain trend and the defocus direction is reliable. For example, a small bluer occurs in the main object.

In the step S114, the camera controller 207 sets the focus assisting display to the fourth display mode in FIG. 3D since both the defocus amount and the defocus direction are unreliable. With the reliability equal to or lower than the second threshold Th_B, for example, the A image signal and the B image signal have low contrasts and the two-image coincidence degree is low. In this state, the object is significantly defocused and it is difficult to calculate the defocus amount.

In the step S115, the camera controller 207 sets the parameter necessary for the focus assisting display, such as color information in the focus assisting display and the orientation and position of the index, based on the display mode set by the above process, and notifies the display unit 205 of it.

Figure 9:
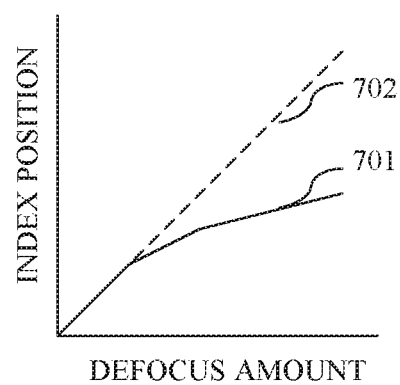
FIG. 9 illustrates a relationship between a defocus amount and a display part position for the focus assisting display according to the first embodiment.

Referring now to FIG. 9, a description will be given of one example of a display position calculating method for the display part in the focus assisting display in the step S109 in FIG. 4. FIG. 9 is a relational view between the defocus amount and the display part position (index position) for the focus assisting display. In FIG. 9, the abscissa axis represents the defocus amount, and the ordinate axis represents the index position. The index position is a moving amount (angle) of the display part (304, 305, 307, and 308) that moves relative to the reference display part (303, 306) fixed at the top according to the second display mode in FIG. 3B.

Assume the constant detection accuracy irrespective of the detected defocus amount. Then, where a relationship between the defocus amount and the index position is linearly expressed as illustrated by a dotted line like 702 in FIG. 9, the focusing operation becomes easy since the operability accords with the display position of the display part. However, in the imaging plane phase difference detection method, as the defocus amount is larger, the focus detection accuracy becomes lower. Hence, when the display part is displaced at the position linearly corresponding to the detected defocus amount, the relationship between the actual focus state and the display part position may conceivably scatter as the detection accuracy becomes lower. In this case, the user may feel unpleasant and the operability may lower.

Hence, as the defocus amount is larger as illustrated by a solid line 701 in FIG. 9, the display part position becomes less likely to move. In other words, as the defocus amount is larger, the display part position change (conversion amount) corresponding to the defocus amount is made smaller. In other words, as the defocus amount is larger, the defocus amount corresponding to the position change per the display part unit angle (unit moving amount) is made larger.

For example, in the focus assisting display expressed by the solid line 701, when the display part position is expressed by an angle, the defocus amount of 0.02 mm per one degree is used to express the defocus amount up to 0.5 mm. The defocus amount of 0.04 mm per one degree is used to express the defocus amount up to 1 mm, and the defocus amount of 0.08 mm per one degree is used to express the defocus amount up to 2 mm.

Assume that one degree is expressed based on the depth of focus. Then, one degree expresses the depth of focus until the defocus amount becomes 0.5 mm. One degree expresses a double value of the depth of focus until the defocus amount becomes 1 mm. One degree expresses a quadruple value of the depth of focus until the defocus amount becomes 2 mm.

Thus, the index position control can realize a stable focus assisting display irrespective of the defocus amount. The index position control is not limited to this example, and is variable according to a diaphragm, an imaging scene, etc.

Figure 10:
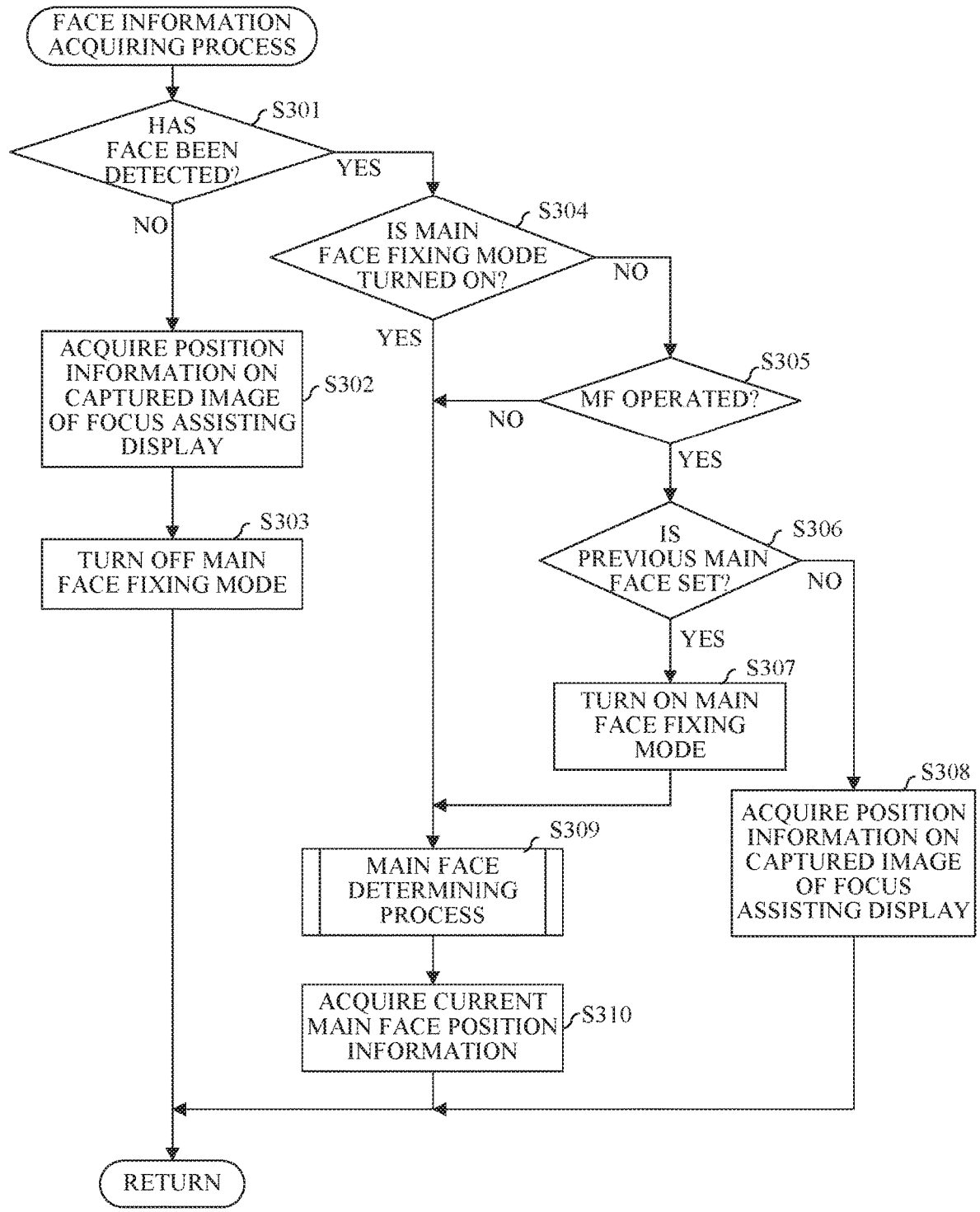
FIG. 10 is a flowchart of a face information acquiring process according to the first embodiment.

Referring now to FIG. 10, a description will be given of the face information acquiring process in the step S101 in FIG. 4. FIG. 10 is a flowchart illustrating a procedure of selecting a main face from among a plurality of faces detected by the face detection processing circuit 209 and for outputting the information of the selected main face position and size.

In the step S301, the camera controller 207 determines whether the face detection processing circuit 209 has detected the face. When the face has been detected, the flow moves to the step S304, and when the face has not yet been detected, the flow moves to the step S302.

In the step S302, the camera controller 207 acquires the focus assisting display position information displayed on the current image.

In the step S303, the camera controller 207 turns off the main face fixing mode.

In the step S304, the camera controller 207 determines whether the main face fixing mode is turned on. When the main face fixing mode is turned on, the flow moves to the step S309, and when the main face fixing mode is turned off, the flow moves to the step S305.

In the step S305, the camera controller 207 determines whether or not the MF is being operated. When the MF is being operated, the flow moves to the step S306, and when the MF is not being operated, the flow moves to the step S309.

In the step S306, the camera controller 207 determines whether the main face was set last time or in the one-frame previous process. When the main face was set, the flow moves to the step S307, and when the main face was not set, the step moves to S308.

In the step S307, the camera controller 207 turns on the main face fixing mode. Turning on the main face fixing mode prohibits the main face from being switched to another face by turning on the main face fixing mode.

In the step S308, the camera controller 207 acquires the position information of the focus assist display displayed on the current image similar to the step S302.

In the step S309, the camera controller 207 executes the main face determining process.

In the step S310, the camera controller 207 acquires the position and the size information of the face that is determined to be the main face.

Figure 11:
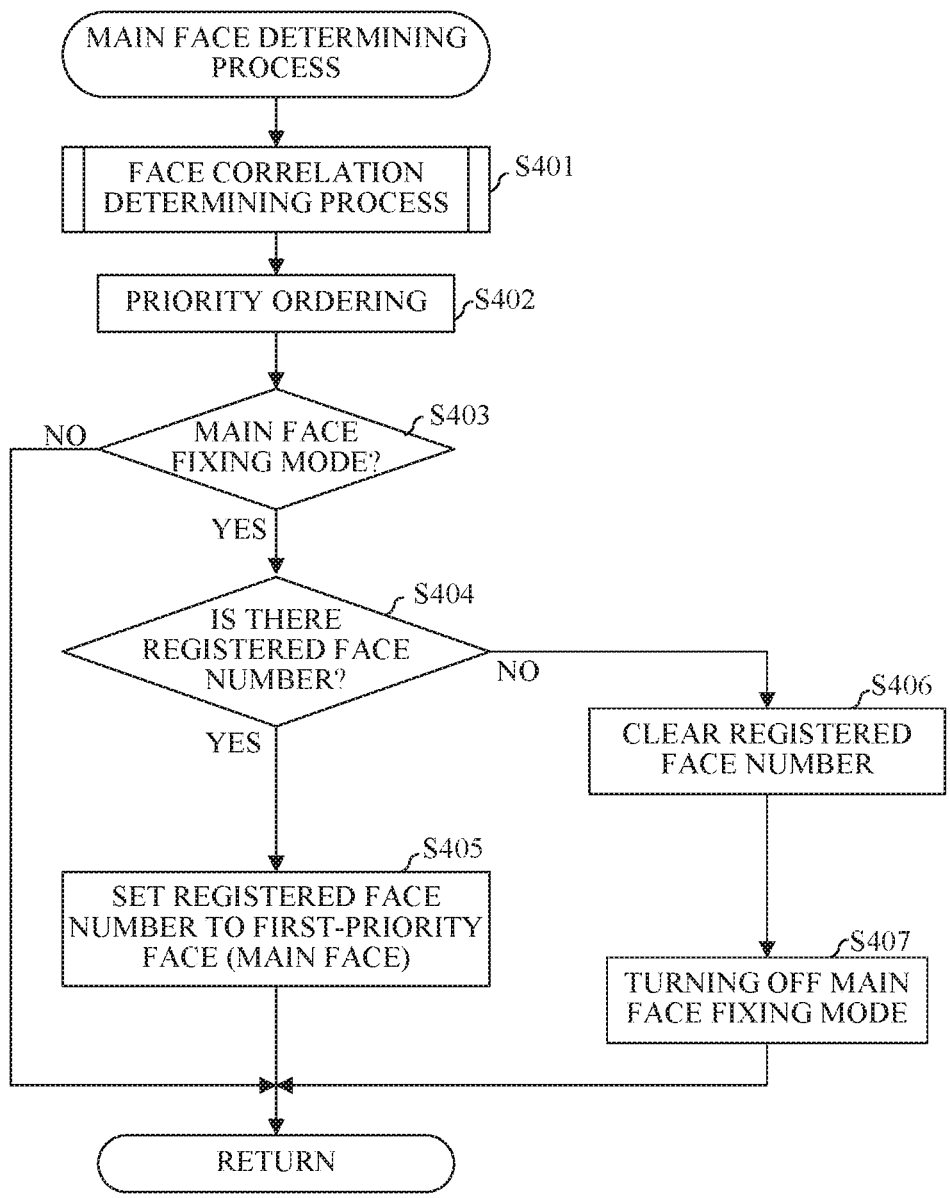
FIG. 11 is a flowchart of a main face determining process according to the first embodiment.

Referring now to FIG. 11, a description will be given of the main face determining process in the step S309 in FIG. 10. FIG. 11 is a flowchart of the main face determining process. In the main face determining process, the camera controller 207 and the face detecting processing circuit 209 serves as the main object determining unit for determining the main object among objects contained in the captured image based on the image signal output from the imaging part (image sensor 201).

In the step S401, the camera controller 207 performs a face correlation determining process based on the face detecting process result by the face detection processing circuit 209. More specifically, the camera controller 207 assigns the face number to each face detected by the face detecting process.

In the step S402, the camera controller 207 sets the face that has the highest priority to the main face through the priority order of the face in accordance with the detected face position and size. The camera controller 207 determines the priority order of the face, for example, so that the larger face closer to the image center gets a higher priority. Alternatively, the camera controller 207 may make higher the priority order of the face also detected last time. Thereby, the frequent switching of the detected face can be restrained. The camera controller 207 can use an arbitrary priority ordering method as long as the photographer feels that the set main face is suitable for the main face by the method.

In the step S403, the camera controller 207 determines whether the main face fixing mode is turned on. When the main face fixing mode is turned on, the flow moves to the step S404, and when the main face fixing mode is turned off, the process ends by setting the first priority face to the main face.

In the step S404, the camera controller 207 compares the face number assigned to the face obtained by the current face detection processing result with the registered main face fixing face numbers, and determines whether there is a face fixedly set as the main face. When the face number assigned to the face obtained by the current face detection processing result has the face number that accords with the registered main face fixing face number, the camera controller 207 determines that there is a face fixedly set as the main face and moves to the step S405. When the face number assigned to the face obtained by the current face detection processing result does not have a face number that accords with the registered main face fixing face number, the camera controller 207 determines that the face fixedly set as the main face has disappeared and moves to the step S406.

In the step S405, the camera controller 207 sets the face corresponding to the registered main face fixed face number to the first priority face (main face).

In the step S406, the camera controller 207 clears the face corresponding to the registered main face fixing face number.

In the step S407, the camera controller 207 turns off the main face fixing mode. When the main face fixing mode is turned off, switching of the main face to another object face is permitted.

Figure 12:
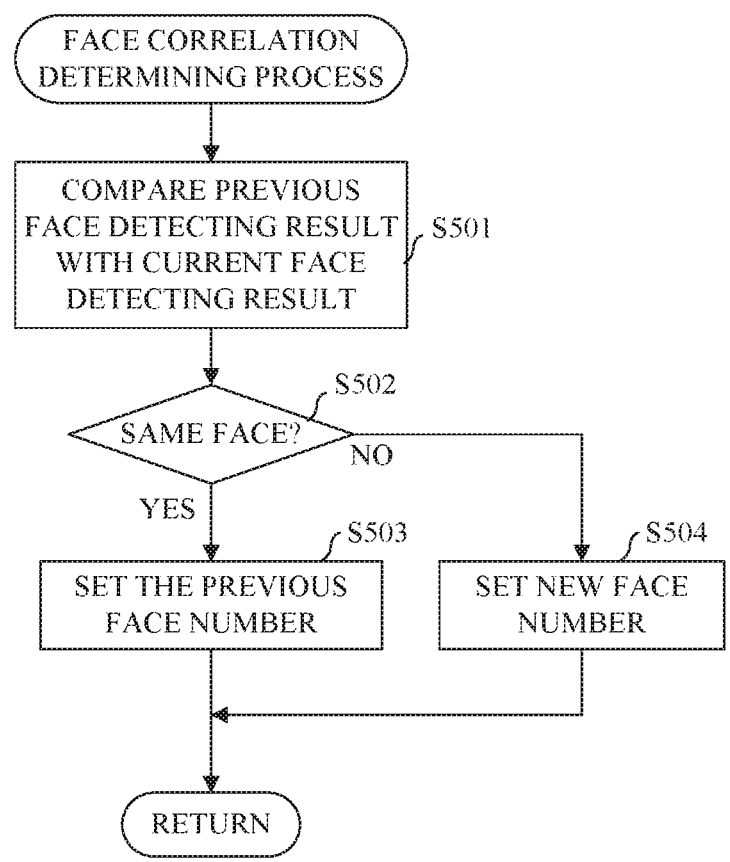
FIG. 12 is a flowchart of a face correlation determining process according to the first embodiment.

Referring now to FIG. 12, a description will be given of the face correlation determining process in the step S401 in FIG. 11. FIG. 12 is a flowchart of the face correlation determining process. The camera controller 207 repetitively executes the following face correlation determining process a plurality of times corresponding to the number of detected faces.

In the step S501, the camera controller 207 compares the previous face detection processing result with the current face detection processing result.

In the step S502, the camera controller 207 determines whether the currently detected face is the same as the previously detected face. When the currently detected face is the same as the previously detected face, the flow moves to the step S503, and when the currently detected face is different from the previously detected face, the flow moves to the step S504. The camera controller 207 provides the comparison based on the detected face position and size, and determines that they are the same faces as the current face position is closer to the previous face position and as the current face is larger than the previous face. More specifically, the camera controller 207 calculates the correlation amount used to determine whether they are the same faces based on the positional difference and the size difference between the faces, and determines that they are the same faces when the correlation amount is high.

In the step S503, the camera controller 207 sets the same number as that of the previously detected face to the currently detected face.

In the step S504, the camera controller 207 sets a new arbitrary face number to the currently detected face.

Thereby, the main face fixing mode is turned on when the face is detected and the MF is operated, and the main face fixing mode is maintained until the current main face is not detected. Hence, after the MF operation ends, the target object for the focus assisting display control is never prevented from being suddenly switched. In addition, where the main face does not exist (or is not detected) after the MF operation starts, the focus assisting display is not controlled for the main face. Thus, the target object for the focus assisting display is never switched in the MF operation, and the main face is stably focused.

Figure 13:
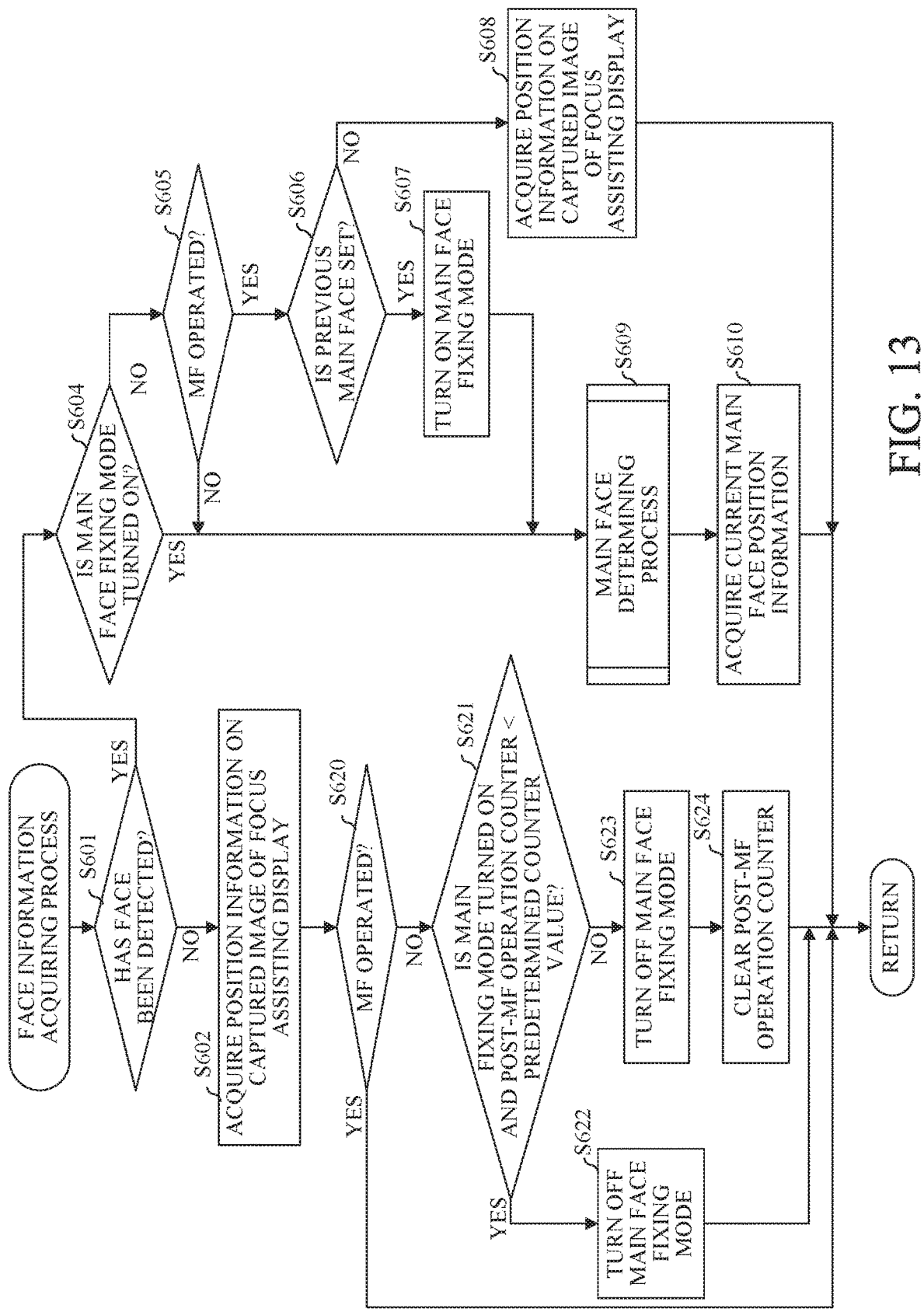
FIG. 13 is a flowchart of the face information acquiring process according to a variation of the first embodiment.

FIG. 13 illustrates a variation of the process in the face information acquiring process in FIG. 10 from when the face is not detected to when the main face fixing mode is turned off. The process after the step S602 (or the steps S620 to S624) is different from the face information acquiring process in FIG. 10. The other processes are similar and thus a detailed description thereof will be omitted.

In the step S620, the camera controller 207 determines whether the MF is being operated. When the MF is being operated, the process ends, and when the MF is not being operated, the flow moves to the step S621.

In the step S621, the camera controller 207 determines whether the main face fixing mode turns on and the post-MF operation counter is smaller than the predetermined count value. When the main face fixing mode turns on and the post-MF operation counter is smaller than the predetermined count value, the flow moves to the step S622, and when the main face fixing mode turns off or when the post-MF operation counter is larger than the predetermined count value (after the predetermined time elapses), the flow moves to the step S623. When the post-MF operation counter is equal to the predetermined count value, the destination step can be arbitrarily set.

In the step S622, the camera controller 207 counts up the post-MF counter.

In the step S623, the camera controller 207 turns off the main face fixing mode.

In the step S624, the camera controller 207 clears the post-MF operation counter.

Thereby, even when the current main face temporarily disappears, the main face fixing mode is turned off so as to prevent the main face from switching for manual focusing with the stable focus assisting display.

According to this embodiment, the imaging apparatus having the focus assisting function in the manual focusing can turn on the main face fixing mode when the manual focusing starts on a human face by using the human face detecting function. In addition, this embodiment does not turn off the main face fixing mode while the current main face exists and before a predetermined time elapses after the current main face disappears. This configuration can prevent the focus assisting display on an object different from the object targeted by the photographer. Thereby, the photographer is less likely to feel unpleasant because of the stable focus assisting display and the improved operability in the manual focusing.

Second Embodiment

Figure 14:
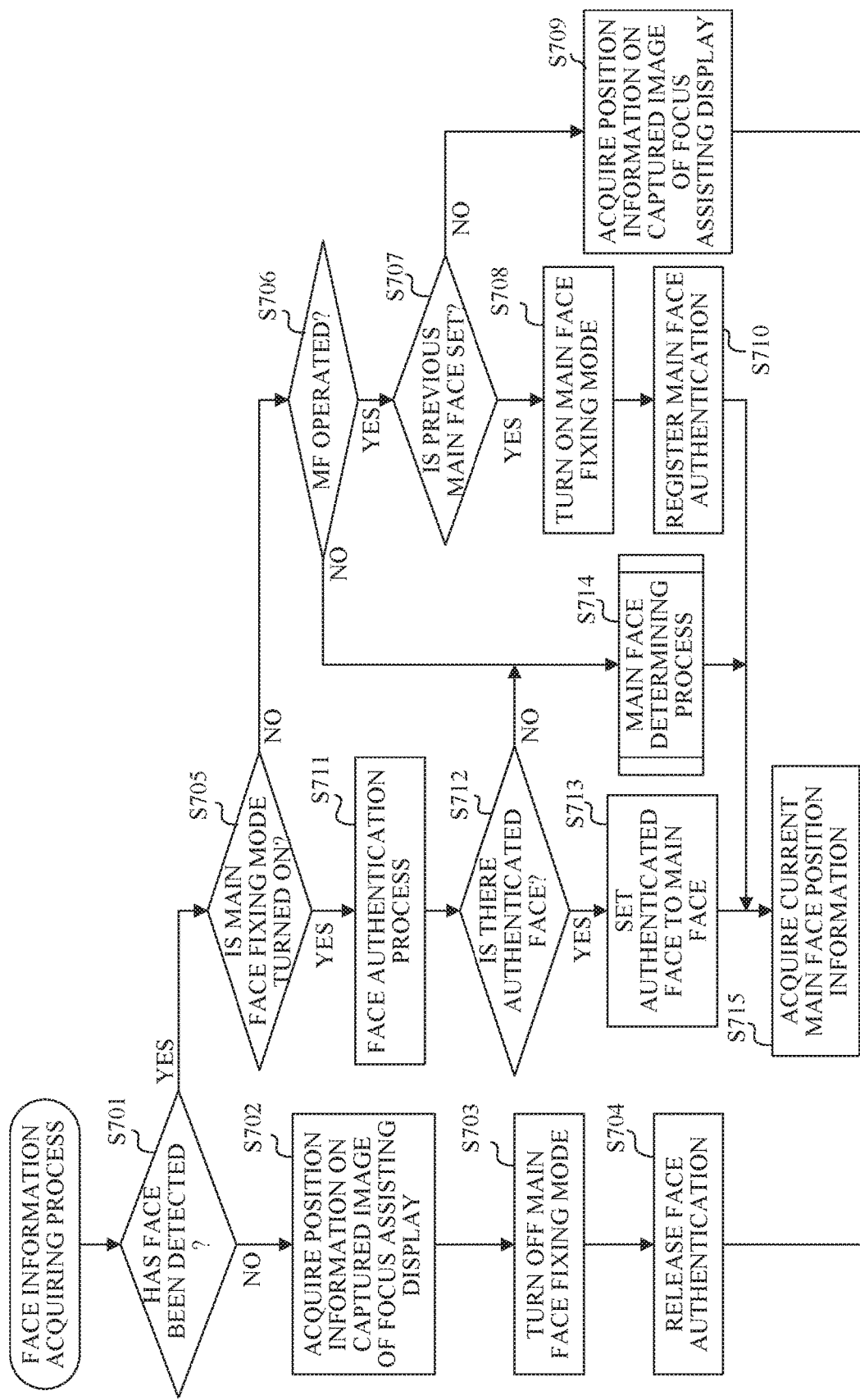
FIG. 14 is a flowchart of the face information acquiring process according to a variation of a second embodiment.

FIG. 14 is a flowchart of a face information acquiring process according to this embodiment. The face information acquiring process according to this embodiment is a variation of that in FIG. 10, and the face detection processing circuit 209 serves as a specific object recognizer having a face recognition processing function that previously registers specific human faces and identifies a registered face among the human faces. A description will now be given of differences, and a description of a structure and control similar to those of the first embodiment will be omitted.

In the step S701, the camera controller 207 determines whether the face has been detected. When the face has been detected the flow moves to the step S705, and when the face has not yet been detected, the flow moves to the step S702.

In the step S702, the camera controller 207 acquires the focus assisting display position information on the captured image.

In the step S703, the camera controller 207 turns off the main face fixing mode.

In the step S704, the camera controller 207 releases the registered authenticated face.

When the face has not detected, the main face fixing mode may be prevented from turning off and the authenticated face may be prevented from being released in the MF operation and before a predetermined time elapses after the MF operation ends, similarly to the process described with reference to FIG. 12.

In the step S705, the camera controller 207 determines whether the main face fixing mode turns on. When the main face fixing mode turns on, the flow moves to the step S711, and when the main face fixing mode turns off, the flow moves to the step S706.

In the step S706, the camera controller 207 determines whether the MF is being operated. When the MF is being operated, the flow moves to the step S707, and when the MF is not being operated, the flow moves to the step S714.

In the step S707, the camera controller 207 determines whether the main face was set last time. When the main face was set last time, the flow moves to the step S708, and when the main face was not set last time, the flow moves to the step S709.

In the step S708, the camera controller 207 turns on the main face fixing mode.

In the step S709, the camera controller 207 acquires the focus assisting display position information on the captured image.

In the step S710, the camera controller 207 registers the current main face as the authenticated face.

In the step S711, the camera controller 207 performs a face authentication process. The face authentication process provides matching between a currently detected face image and registered face images and outputs, as the authenticated face image, a face image similar to the registered face image. The face authentication process may use any conventional methods.

In the step S712, the camera controller 207 determines whether the authenticated face exists. When the authenticated face exists, the flow moves to the step S713, and when the authenticated face does not exist, the flow moves to the step S714.

In the step S713, the camera controller 207 sets the authenticated face to the main face.

In the step S714, the camera controller 207 sets another result of the main face determining process to the main face.

In the step S715, the camera controller 207 acquires the current main face position information.

According to this embodiment, the imaging apparatus having the focus assisting function in the manual focusing uses the face recognition function that recognizes the registered specific human face in comparison with the first embodiment. Thereby, even when another object crosses in front of the main object, the main object can be again specified without switching the main object. This embodiment can provide a stable function, improve the operability, and prevent the photographer to feel unpleasant.

Advantages of the First and Second Embodiments

The first and second embodiments can prevent the main object targeted by the photographer from being switched in manual focusing on the human face by utilizing the face detection function and the focus assisting display.

In addition, the first and second embodiments register the main object by utilizing the specific face recognition function when the manual focusing starts. Thereby, these embodiments can prevent the main object from being switched to another object crossing in front of the main object.

This configuration can provide a display control apparatus that can provide stable manual focusing by utilizing the focus assisting display control, and improve the operability of the photographer.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102497, filed on May 24, 2017, which is hereby incorporated by reference herein in its entirety.

What is claimed is:

1. A display control apparatus comprising:
   a memory device that stores a set of instructions; and
   at least one processor that executes the set of instructions to function as:
   a focus detector configured to detect a focus state based on an image signal acquired from an imaging part;
   a main object detector configured to detect a main object among objects in an image based on the image signal output from the imaging part;
   a determiner configured to determine whether or not manual focusing by a user is being performed; and
   a display controller configured to display on a display unit an index representing the focus state detected by the focus detector on the main object detected by the main object detector,
   wherein the display controller performs a control so as to inhibit switching of the main object in a case where the determiner determines that the manual focusing by the user is being performed.

2. The display control apparatus according to claim 1, wherein the display controller inhibits the main object from being switched when the main object detector detects the main object after the manual focusing starts.

3. The display control apparatus according to claim 1, wherein the display controller inhibits the main object from being switched while the main object detector detects the main object after the manual focusing ends.

4. The display control apparatus according to claim 1, wherein the display controller allows the main object to switch before a predetermined time elapses after the manual focusing ends and the main object detector does not detect the main object.

5. The display control apparatus according to claim 1, wherein the at least one processor further functions as a specific object recognizer configured to recognize a specific object in the image,
   wherein the main object detector detects as a current object an object recognized by the specific object recognizer, and
   wherein the specific object recognizer registers the current main object as the specific object when the manual focusing starts.

6. The display control apparatus according to claim 5, wherein the specific object recognizer inhibits a registration of the current main object from being released when the main object detector detects the current main object after the manual focusing ends.

7. The display control apparatus according to claim 5, wherein the specific object recognizer releases a registration of the current main object a predetermined time after the main object detector does not detect the current main object after the manual focusing ends.

8. The display control apparatus according to claim 5, wherein the specific object recognizer releases a registration of the current main object until the manual focusing ends, if the main object detector does not detect the main object when the manual focusing starts.

9. The display control apparatus according to claim 1, wherein the index is based on a detection result of the focus state using the image signal corresponding to the main object by the focus detector.

10. An imaging apparatus comprising:
    an imaging part that includes a plurality of pixels each having a plurality of photoelectric converters for one micro lens, and is configured to receive a light flux from an imaging optical system through the plurality of photoelectric converts and to output a pair of image signals;
    a memory device that stores a set of instructions; and
    at least one processor that executes the set of instructions to function as:
    a focus detector configured to detect a focus state based on the pair of image signals through a phase difference type of a focus detection;
    a determiner configured to determine whether or not manual focusing by a user is being performed;
    a main object detector configured to detect a main object among objects in an image based on the image signal output from the imaging part; and
    a display controller configured to display on a display unit an index representing a focus state detected by the focus detector on the main object detected by the main object detector,
    wherein the display controller performs a control so as to inhibit switching of the main object in a case where the determiner determines that the manual focusing by the user is being performed.

11. A display control method comprising:
    a focus detection step of detecting a focus state based on an image signal acquired from an imaging part;
    a main object detection step of detecting a main object among objects in an image based on the image signal output from the imaging part;
    a determination step of determining whether or not manual focusing by a user is being performed; and
    a display control step of performing control so as to display on a display unit an index representing the focus state detected by the focus detection step on the main object detected by the main object detection step,
    wherein in the display control step, switching of the main object is inhibited in a case where the determination step determines that the manual focusing by the user is being performed.

* * * * *